March 2, 1965 J. C. MARINACE 3,171,761

PARTICULAR MASKING CONFIGURATION IN A VAPOR DEPOSITION PROCESS

Filed Oct. 6, 1961

2 Sheets-Sheet 1

INVENTOR
JOHN C. MARINACE

BY John F. Ahlandt Jr.
ATTORNEY

United States Patent Office
3,171,761
Patented Mar. 2, 1965

3,171,761
PARTICULAR MASKING CONFIGURATION IN A VAPOR DEPOSITION PROCESS

John C. Marinace, Yorktown Heights, N.Y., assignor to International Business Machines Corporation, New York, N.Y., a corporation of New York
Filed Oct. 6, 1961, Ser. No. 143,322
5 Claims. (Cl. 148—175)

This invention relates to the fabrication of semi-conductor devices and, in particular, to the fabrication of a plurality of such devices in a single operation.

Problems have been encountered in the fabrication of pluralities of semiconductor devices by the fact that the small physical size of the devices result in handling difficulties, such as in cutting to size and in properly orienting devices for attaching of electrodes and also in positioning the devices precisely in ordered circuit arrangements. The problems are especially severe when the devices are made in a plurality of separate process steps because it is very difficult to apply the process steps exactly to each one of the devices of a group, and, therefore, the output characteristics of the individual devices tend to vary widely. In such a situation it becomes necessary to perform very detailed measurements in order to match up the characteristics of the individual devices so that identical performance will be realizable from all devices that are destined for the same type of circuit application or that are involved together in a matrical type of circuit.

A previous technique that has been utilized advantageously for the simultaneous fabrication of a plurality of semiconductor devices is described in application Serial No. 863,000, now U.S. Patent 3,133,336, assigned to the assignee of the present invention. The technique therein described permits in a single operation the simultaneous fabrication of a plurality of devices in spatial relationship, whereby all the devices are made simultaneously by the same process steps with the result that each device in the spatial configuration exhibits identical performance characteristics.

What has been discovered, thereby forming the basis of the present invention, is that the masking technique, which is successfully employed in the aforesaid application Serial No. 863,000, may be advantageously turned to the fabrication of more specialized individual devices by reason of the fact that in the vapor growth procedure, the depositing semiconductor material will preferentially deposit under the mask if the mask is suitably disposed.

It is, therefore, a primary object of the present invention to provide an improved technique of fabricating specialized semiconductor junction devices en masse.

Another object is to provide a technique of fabricating specialized semiconductor junction devices in an array.

A further object is to deposit material in a vapor growth technique preferentially under a mask so as to make possible the simple fabrication of specialized devices.

The foregoing and other objects, features and advantages of the invention will be apparent from the following more particular description of preferred embodiments of the invention, as illustrated in the accompanying drawings.

Figure 1:
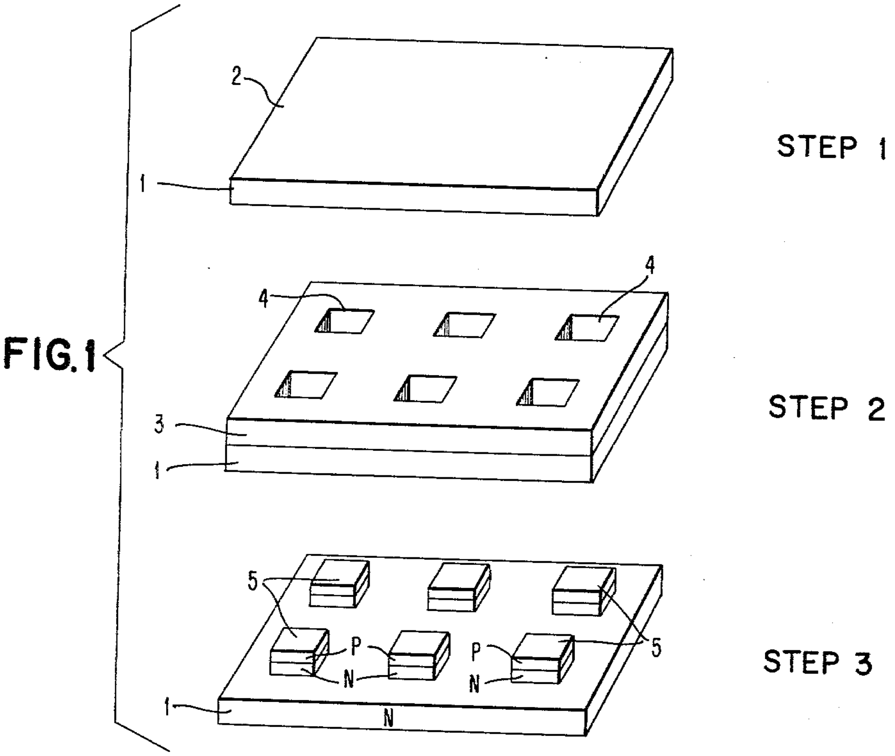
FIG. 1 is a flow chart of a semiconductor device fabrication technique that has been disclosed in previously filed application Serial No. 863,000.

Reference is made to FIG. 1, wherein are shown the process steps that have been successfully employed in the technique of application Serial No. 863,000. In step 1 there is shown a typical substrate, labeled 1, which may be, for example, of germanium, having a top surface 2. In step 2, there is illustrated a mask 3, employed with this prior-art technique, situated on the top surface of the substrate 1. The mask 3, constituted for example of glass, has apertures suitably located which are labeled 4 in FIG. 1. After the mask 3 has been situated on the substrate 1, the vapor growth process is initiated. This process has been amply disclosed, for example, in application Serial No. 816,572, now U.S. Patent 3,047,438, and involves a halide disproportionation reaction, wherein a halogen, such as iodine, is reacted with a source of semiconductor material to produce a semiconductor halide compound in vapor form, with the eventual result that semiconductor material, from the vapor that is thus generated, is epitaxially deposited onto a substrate, situated in a zone of properly selected temperature. Typically, in this vapor growth process differently doped semiconductor material may be sequentially deposited so that alternate conductivity-type zones are formed, so that, as shown in step 3, what eventuates is a plurality of discrete devices 5 situated on top of the substrate 1. These devices have, for example, two zones of opposite conductivity-type. The devices 5, by virtue of being monocrystalline extensions of the substrate 1, effectively have one electrode thereof connected to a common point so that all that is required is a single ohmic connection to the substrate 1. Individual connections are made to the top portions of the separate devices to complete the requisite circuitry.

Figure 2:
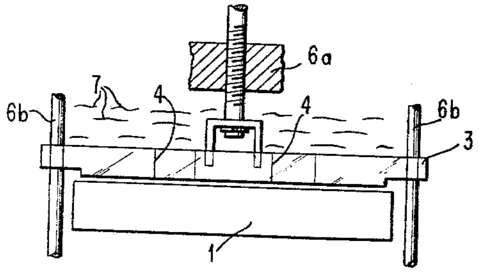
FIG. 2 is a side view of one type of arrangement for realizing the basic phenomenon of the present invention.
Figure 3:
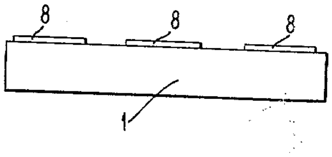
FIG. 3 is a side view of the semiconductor structural configuration resulting from the arrangement of FIG. 2.

Referring now to FIG. 2, there is illustrated one arrangement for realizing an array of devices by virtue of positive masking, that is, masking that permits the deposition of material under the mask and thus forms a configuration which may be termed a positive configuration. The prior-art technique illustrated in FIG. 1 yields, on the other hand, what may be termed a negative configuration. Suitable means comprising elements *6a* and *6b* are advantageously utilized to enable the positioning of the mask in such a manner as to allow a separation of approximately one mil. Of course, other suitable means such as shims could be used to provide the requisite spacing. When the halide vapor 7, generated by the aforesaid halide disproportionation reaction, passes over the mask 3, which has been positioned by the means *6a* and *6b* a suitable distance from the substrate, deposition of the semiconductor from the halide vapor will take place preferentially under the mask 3 so as to result, as illustrated in FIG. 3 in a plurality of discrete zones labeled 8. It is not perfectly clear why the deposition occurs preferentially, but is believed that a higher $GeI_2$ concentration (in the case of germanium) exists under the mask and hence the reaction proceeds faster there.

Thus the technique of the present invention affords an important refinement of the prior-art technique. This refinement may be utilized to great advantage by suitable modification as illustrated in FIG. 4 wherein a specialized structure for the mask is employed.

Figure 4:
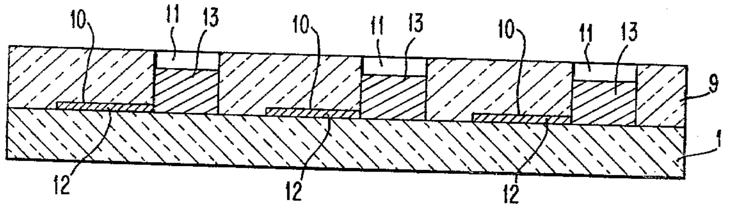
FIG. 4 is a side view of a preferred masking scheme for applying the technique of the present invention.

As shown in FIG. 4, a typical substrate 1 is again used. The mask 9 is similar to the mask 3 previously illustrated in FIG. 1. However, recesses or channels 10 to a depth of approximately one mil are provided on the underside of the mask 9. Now, when the semiconductor halide vapor which, for example, has been selected to be p-type, is permitted to flow over the mask 9, deposition will take place in the recesses or channels 10, and this step of the technique of the present invention is continued until the recesses are entirely filled with semiconductor material labeled 12. Thereafter, by procedures well known in the vapor-growth art, the conductivity-type of the depositing material is changed so that, in the illustrative example, n-conductivity-type material 13 is deposited in the holes or apertures 11.

Figure 5:
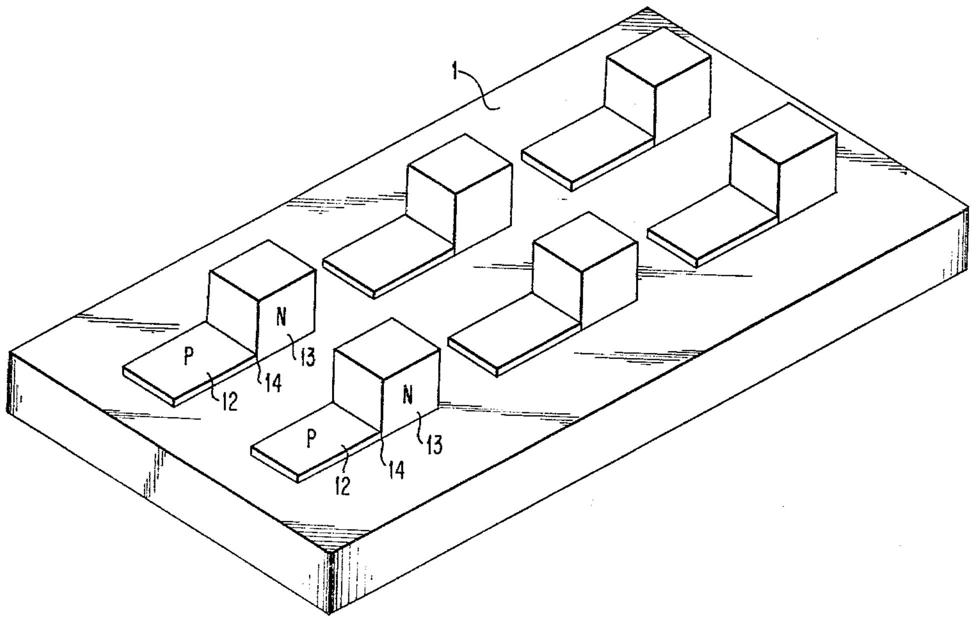
FIG. 5 is a perspective view of a matrix of specialized devices obtained by the technique of the present invention.

FIG. 5 illustrates the final composition of the arrays formed in accordance with the technique of the present invention, wherein a plurality of discrete devices are shown situated on top of the substrate 1. It is to be noted in this connection that for the particular type of device that has been fabricated, which is a line-junction type device, the junction area which has been obtained is a very small one. Thus, as illustrated in FIG. 5, semiconductor portions 12 and 13, which are of opposite conductivity-type, are joined at junction 14. Since the portion 12 is of a very slight thickness because of the advantageous masking, the junction area is small. For the configuration illustrated in FIG. 5, the substrate 1 is selected to have a very high resistivity, that is, substantially intrinsic and to act in this case effectively as an insulator. However, it will be obvious to those versed in the art that the technique of the present invention is not limited to this precise arrangement.

What has been provided by the technique of the present invention is a simple way of realizing simultaneous deposition of a plurality of specialized devices whose junction areas are very small and which are so formed as to enable ready attachment of required electrical leads.

While the invention has been particularly shown and described with reference to preferred embodiments thereof, it will be understood by those skilled in the art that various changes in form and details may be made therein without departing from the spirit and scope of the invention.

What is claimed is:

1. A process of simultaneously fabricating a plurality of semiconductor line-junction devices comprising the steps of providing a monocrystalline semiconductor substrate having at least one major surface; positioning a mask in contact with said one major surface of said substrate, said mask having formed therein a plurality of apertures and substantially perpendicular respectively to said apertures a plurality of recesses of a depth of approximately 1 mil; maintaining said mask in contact with said substrate so that said plurality of recesses define restricted volumes at the substrate surface for the deposition of semiconductor material; exposing for a predetermined time the assembly of said substrate and said mask to a decomposing halide vapor, said vapor containing a conductivity-type determining impurity, whereby semiconductor material is deposited preferentially in said recesses; further exposing the assembly to a decomposing halide vapor containing an opposite conductivity-type determining impurity whereby semiconductor material of opposite conductivity-type to said first deposited material is deposited in said apertures formed in said mask, whereby a plurality of line-junction devices are formed.

2. A process of simultaneously fabricating a plurality of semiconductor line-junction devices comprising the steps of providing a monocrystalline semiconductor substrate having at least one major surface; positioning a glass mask in contact with said one major surface of said substrate, said glass mask having a plurality of apertures therein and said glass mask having substantially perpendicular respectively to said apertures a plurality of recesses of a depth of approximately 1 mil; maintaining said glass mask in contact with said substrate so that said plurality of recesses define restricted volumes at the substrate surface for the deposition of semiconductor material; exposing for a predetermined time the assembly of said substrate and said glass mask to a decomposing halide vapor, said vapor containing a conductivity-type determining impurity, whereby semiconductor material is deposited preferentially in said recesses; further exposing the assembly to a decomposing halide vapor containing an opposite conductivity-type determining impurity whereby semiconductor material of opposite conductivity-type to said first formed material is deposited in the apertures formed in said glass mask whereby a plurality of line-junction devices are formed.

3. The process as defined in claim 1 wherein said halide vapor is constituted of a compound formed by reacting iodine with a source of semiconductor material.

4. A process of fabricating a semiconductor array of line-junction devices comprising the steps of positioning a device-defining mask in contact with a surface of a monocrystalline substrate of substantially intrinsic semiconductor material, said device-defining mask having a plurality of device-defining apertures and perpendicular to each of said apertures, on the contacting surface of said mask, a device-defining recess having a depth of about 1 mil; maintaining said mask in contact with said substrate so that each recess defines a restricted volume at the substrate surface for the deposition of semiconductor material; exposing, for a time sufficient to epitaxially deposit semiconductor material, the assembly of said mask and said substrate to a decomposing vapor of a compound formed from a halogen and a semiconductor material, said exposing step being carried out in the presence of sequentially applied semiconductor material of opposite conductivity-types.

5. A process of fabricating a semiconductor array of line-junction devices comprising the steps of positioning a device-defining mask in contact with a surface of monocrystalline substrate of substantially intrinsic germanium, said device-defining mask having a plurality of device-defining apertures and perpendicular to each of said apertures, on the contacting surface of said mask, a device-defining recess having a depth of about 1 mil; maintaining said mask in contact with said substrate so that each recess defines a restricted volume at the substrate surface for the deposition of semiconductor material; exposing, for a time sufficient to deposit germanium, the assembly of said mask and said substrate to a decomposing vapor of a compound formed from a halogen and germanium, said exposing step being carried out in the presence of sequentially applied germanium of opposite conductivity-types.

References Cited by the Examiner

UNITED STATES PATENTS

| | | | |
|---|---|---|---|
| 2,850,414 | 9/58 | Enomoto | 148—1.6 |
| 2,910,634 | 10/59 | Rutz | 148—1.5 X |
| 3,012,902 | 12/61 | Bayer | 117—106 |
| 3,047,438 | 7/62 | Marinace | 148—175 |
| 3,099,579 | 7/63 | Spitzer et al. | 117—200 |

FOREIGN PATENTS

| | | |
|---|---|---|
| 1,029,941 | 5/58 | Germany. |

OTHER REFERENCES

Marinace: "Semiconductor Fabrication," IBM Technical Disclosure Bulletin, vol. 3, No. 4, September 1960, p. 42.

DAVID L. RECK, *Primary Examiner.*